(12) United States Patent
Volkl et al.

(10) Patent No.: US 10,842,599 B2
(45) Date of Patent: *Nov. 24, 2020

(54) METHOD FOR PRODUCING A DENTAL RESTORATION

(71) Applicant: DENTSPLY SIRONA Inc., York, PA (US)

(72) Inventors: Lothar Volkl, Goldbach (DE); Stefan Fecher, Johannesberg (DE)

(73) Assignee: DENTSPLY SIRONA INC., York, PA (US)

( * ) Notice: Subject to any disclaimer, the term of this patent is extended or adjusted under 35 U.S.C. 154(b) by 602 days.

This patent is subject to a terminal disclaimer.

(21) Appl. No.: 15/391,301

(22) Filed: Dec. 27, 2016

(65) Prior Publication Data

US 2017/0189146 A1    Jul. 6, 2017

(51) Int. Cl.
*A61C 13/08*    (2006.01)
*A61C 13/083*   (2006.01)
(Continued)

(52) U.S. Cl.
CPC .............. *A61C 13/081* (2013.01); *A61C 5/73* (2017.02); *A61C 5/77* (2017.02); *A61C 13/0004* (2013.01);
(Continued)

(58) Field of Classification Search
None
See application file for complete search history.

(56) References Cited

U.S. PATENT DOCUMENTS 2,371,344 A    3/1945   Miller
6,379,593 B1   4/2002   Datzmann
(Continued)

FOREIGN PATENT DOCUMENTS

DE    102011055393 B4    3/2016
EP    2371344 A1         10/2011
(Continued)

OTHER PUBLICATIONS

International Search Report; PCT/EP2016/082550; Mar. 10, 2017 (completed); dated Mar. 21, 2017.
(Continued)

*Primary Examiner* — Monica A Huson
*Assistant Examiner* — Kelsey C Grace
(74) *Attorney, Agent, or Firm* — Dentsply Sirona Inc.

(57) ABSTRACT

The invention relates to a method for the production of a dental restoration from a blank, which has regions or layers of ceramic materials with differing compositions, under use of the method steps, filling of the ceramic materials into a mold, pressing of the ceramic materials to form a blank, removal of the blank from the mold, temperature treatment of the blank, wherein the ceramic materials are filling into the mold in such a way that layers and/or regions after temperature treatment have a profile that is available as a digital set. There is then a virtual contouring of the dental restoration taking shrinkage into account, a virtual representation of the blank, positioning of the virtually represented dental restoration in the virtually represented blank taking into account the material characteristics of the layers and/or regions, determination of the data for the blank which correspond to the position of the virtually arranged dental restoration or the mold in the blank, as well as transfer of the data to a machine to produce the dental restoration from the blank.

5 Claims, 13 Drawing Sheets

Figure 1A:
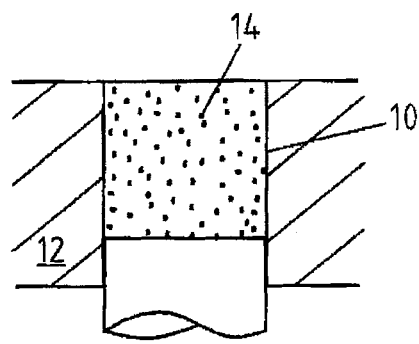

(51) Int. Cl.
*A61C 5/77* (2017.01)
*A61C 5/73* (2017.01)
*A61C 13/00* (2006.01)
*A61C 13/09* (2006.01)

(52) U.S. Cl.
CPC ........ *A61C 13/0022* (2013.01); *A61C 13/083* (2013.01); *A61C 13/09* (2013.01)

(56) References Cited

U.S. PATENT DOCUMENTS

| | | |
|---|---|---|
| 8,025,992 B2 | 9/2011 | Engels |
| 8,632,889 B2 | 1/2014 | Thiel |
| 8,691,122 B2 | 4/2014 | Rheinberger |
| 8,936,848 B2 | 1/2015 | Jung |
| 9,255,038 B2 | 2/2016 | Stephan |
| 2003/0222366 A1* | 12/2003 | Stangel .............. A61C 13/0004 264/16 |
| 2006/0008774 A1 | 1/2006 | Orth |
| 2013/0221554 A1 | 8/2013 | Jung |
| 2014/0328746 A1 | 11/2014 | Yamada |
| 2015/0282905 A1 | 10/2015 | Jahns |
| 2016/0242881 A1 | 8/2016 | Fisker |
| 2017/0258563 A1* | 9/2017 | Volkl ................... A61C 13/082 |

FOREIGN PATENT DOCUMENTS

| | | |
|---|---|---|
| EP | 3006418 A1 | 4/2016 |
| JP | 2004035332 A | 2/2004 |
| WO | 2014181827 A1 | 11/2014 |
| WO | 2015051095 A1 | 4/2015 |

OTHER PUBLICATIONS

Written Opinion of the International Searching Authority; PCT/EP2016/082550; Mar. 10, 2017 (completed); dated Mar. 21, 2017.
International Preliminary Report on Patentability; PCT/EP2016/082550; Mar. 10, 2017 (completed); dated Mar. 21, 2017.

* cited by examiner blank stored as CAD-file

CAD-model of a tooth

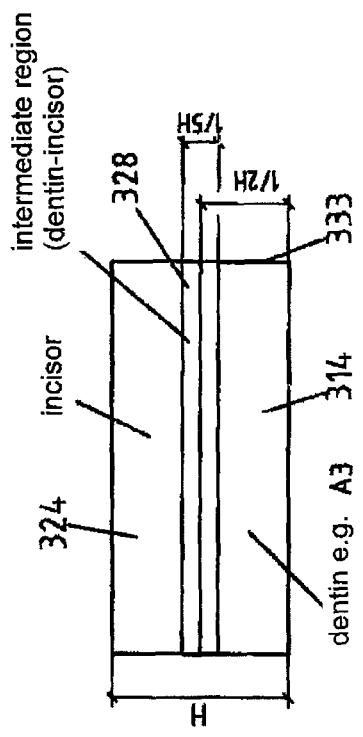
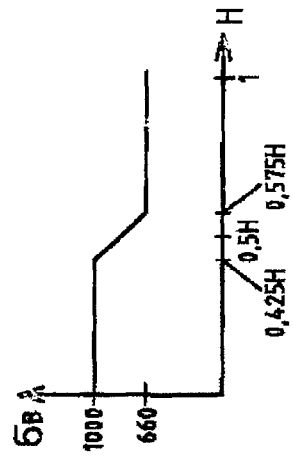
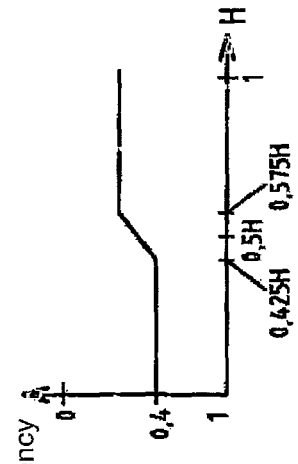
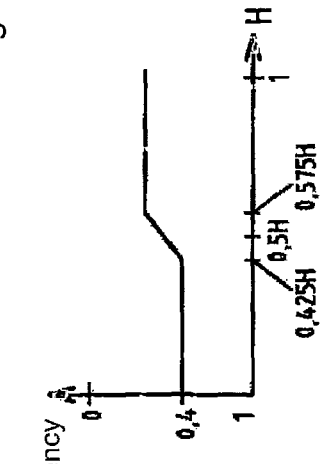

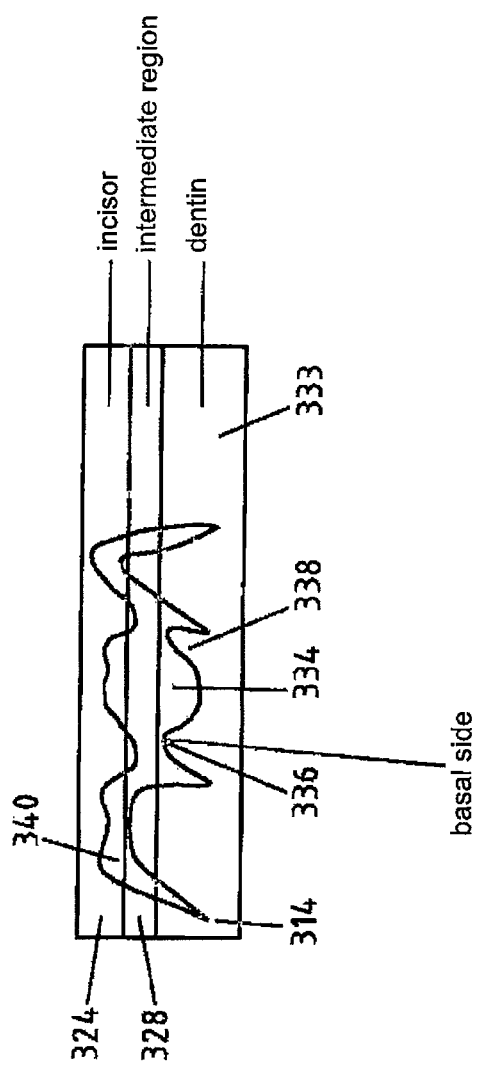

METHOD FOR PRODUCING A DENTAL RESTORATION

THE CROSS-REFERENCE TO RELATED APPLICATIONS

This patent application claims the benefit of and priority to German Patent Application No. 10 2015 122 865.3, filed on Dec. 28, 2015, which is herein incorporated by reference for all purposes.

TECHNICAL FIELD

The invention relates to a method for the production of a dental restoration from a blank, with regions or layers of ceramic material of differing compositions.

BACKGROUND

U.S. Pat. No. 8,936,848 B2 discloses a blank of zirconium dioxide that is used for the production of a tooth replacement and consists of a number of layers of different chemical compositions. The individual layers thereby have different percentages of yttrium oxide. CAD (Computer Aided Design)/CAM (Computer Aided Manufacturing) procedures are used to produce the tooth replacement. A selection is made from a number of tooth shapes to fit a tooth stump that is to be provided with a tooth replacement according to the best-fit method. The digital data for the selected tooth are then fed into a numerically controlled milling machine to produce the tooth replacement from the blank.

A body of zirconium dioxide exhibits a decrease or increase in chromaticity along a straight line in the L*a*b* color space (US 2014/0328746 A1).

A blank of zirconium dioxide for the preparation of dental objects in accordance with WO 2014/062375 A1 has at least two material regions which have different proportions of tetragonal and cubic crystal phases, wherein in one of the regions the ratio is greater than 1 and in the other region the ratio is lower than 1.

EP 2 371 344 A1 relates to a ceramic body which is enriched with a stabilizing agent from the surface to a desired depth.

Zirconium dioxide is used as a ceramic material to produce dental restorations. A framework can be milled, for example, from a blank of zirconium dioxide and can then be sintered. In the following processing stages a veneer is applied manually to the framework, wherein at least one incisor material is applied manually and fused. All of these process measures are time-consuming and moreover do not ensure that the dental restoration will meet requirements.

SUMMARY OF THE INVENTION

It is an object of the present invention to develop a method of the aforementioned type in such a way that a dental restoration is made available without laborious post-processing, which satisfies aesthetic requirements and moreover is of high strength particularly in regions under severe loads.

To achieve this aim a method is proposed for the production of a dental restoration from a blank, which has regions or layers of ceramic materials with differing compositions, comprising the steps below:

a) Filling of a first layer of a first ceramic material in pourable condition into a mold,
b1) Structuring the first layer in such a way that the first layer when viewed across its surface differs from region to region in its height, and then as a second layer filling into the mold a second ceramic material in pourable condition with a composition that is different from that of the first layer, or
b2) after filling of the first layer (414), filling a further layer (427) of a further ceramic material in pourable condition into the mold, which differs from the first ceramic material, mixing material of the first layer with the material of the further layer to form an intermediate layer (428), and then filling a second ceramic material into the mold, or
b3) after filling the first layer forming of at least one first open cavity (318) in the first layer and then filling a second ceramic material into the at least one first open cavity, wherein the ceramic materials contain zirconium dioxide doped with yttrium oxide ($Y_2O_3$), calcium oxide (CaO), magnesium oxide (MgO) and/or cerium oxide ($CeO_2$), and wherein the material of the first layer (14) differs from the material of the second layer (24) in terms of color and proportions of stabilized crystal forms present at room temperature,
c) Pressing of the ceramic materials to form a blank,
d) Removal of the blank from the mold,
e) Temperature treatment of the blank,
wherein in accordance with the method steps a)+b1), or a)+b2), or a)+b3) the ceramic materials are filled into the mold and/or treated in the mold in such a way that layers and/or regions after the temperature treatment exhibit a pre-determined course that is available as a digital data set,
f) Virtual designing of the dental restoration or a form that corresponds to the dental restoration taking shrinkage into account,
g) Virtual representation of the blank, positioning of the virtually represented dental restoration or the form in the blank, taking into consideration the material properties of the layers and/or regions,
h) Determination of data for the blank that corresponds to the position of the virtually arranged dental restoration or the form in the blank,
i) Transfer of the data to a machine to derive the dental restoration or the form from the blank.

According to the invention, a restoration to be machined, in particular by milling and/or grinding is positioned within a pre-sintered blank which is to be machined, in particular by milling and/or grinding, which has layers or regions of different material properties, in particular different translucency and strength, so that the dental replacement, also named as dental restoration or tooth replacement, produced from a pre-sintered blank optimally meets requirements, in particular in terms of translucency and strength. If the tooth replacement is produced from a pre-sintered blank, then the shrinkage occurring during final sintering is taken into account in the contouring, i.e. during the contouring of the dental tooth replacement. There is naturally also the possibility that, after process step d), the blank is completely sintered so that a corresponding shrinkage factor does not need to be taken into account.

In accordance with the invention, the material properties, such as optical and mechanical properties of the blank and the profile of the layers or regions of different compositions present in the blank which ensure the desired properties such as translucency and strength, are stored in a database, so that the blank can be visualized, for example, on a monitor. In this virtual representation of the blank, the three-dimensional tooth replacement designed, for example, by means of dental CAD software, is placed, for example, with incisal and dentin regions being positioned in the blank such that the incisal edge or a part thereof extends in a region of the blank in which the blank has a desired color profile and/or translucency. The dentin portion can then be positioned in an adjacent region in which the material of the blank has the required strength.

The teaching according to the invention does not necessarily require a veneer to be applied by hand, even though this could take place, as well as a firing of a glaze. At the same time, it is ensured that the restoration has a high strength in its region that is under severe loads.

In particular, the invention provides that, after a first layer of a first ceramic material has been filled into a mold, the layer is structured on its surface in such a way that, when viewed along its surface varies in height from one region to another, i.e. does not have a constant fill height, and a second layer that differs from the first layer in its composition of a ceramic material is then filled into the mold.

Alternatively, there is the possibility that, after filled of the first layer, an intermediate layer of a ceramic material is filled into the mold which differs from the first layer, that the material of the first layer is mixed with the material of the intermediate layer, and that then the second layer is filled into the mold. It is in particular provided that starting from the free surface of the first layer up to a height of approximately twice the height of the intermediate layer the material of the intermediate layer is mixed with the material of the first layer. Furthermore, it is provided in particular for the material of the intermediate layer to be one which is the same as that of the second layer.

According to the first alternative of the invention, a first layer of pourable material is filled into a mold. This may be, for example, a colored tooth-colored zirconium dioxide granulate, which has a bulk density, for example, between 1 g/cm$^3$ and 1.4 g/cm$^3$, in particular in the range 1.15 g/cm$^3$ to 1.35 g/cm$^3$. After the granules have been filled, which can have a grain size D50 of between 40 μm and 70 μm, the surface is smoothed before a structure is formed in such a way that elevations and valleys are produced which in particular are parallel to one another, preferably extendedly concentrically or parallel to each other. For this purpose, it is provided, in particular, that the structure is formed by an element which moves, and in particular rotates, relative to the first layer, which in particular structures the surface region of the first layer by means of a wave-like, comb-like or saw-tooth-like section. There is a virtual "raking" of the surface to form the structure, i.e. the alternating elevations and valleys In particular, it is provided that the structure is formed in such a way that the volume of the elevations is equal to, or approximately equal to, the volume of the depressions or valleys.

Preferably, the saw-tooth-like element should have V-shaped teeth which are symmetrically formed and whose flanks enclose an angle between 15° and 45°. The distance between adjacent teeth, i.e. the distance between peaks, should be between 1 and 4 mm, preferably between 1 mm and 3 mm.

The pourable second ceramic material is then filled into the mold, which increases in quantity from the troughs of the structure formed by the valleys, so that as a result there is a quasi-continuous increase in the proportion of the second layer across the height of the elevations. After the surface has been smoothed, the layers are pressed, yielding a density of approximately 3 g/cm$^3$. Pre-sintering is then carried out at a temperature between 700° C. and 1100° C., in particular in a range between 800° C. and 1000° C., for a period of time, for example, from 100 minutes to 150 minutes. The blank produced in this way is then worked to yield, for example, a desired dental restoration by milling and/or grinding, which is subsequently sintered until final density is obtained which for zirconium dioxide, for example, is between 6.00 g/cm$^3$ and 6.1 g/cm$^3$, in particular between 6.04 g/cm$^3$ und 6.09 g/cm$^3$.

Complete sintering is carried out, for example, over a time between 10 minutes and 250 minutes at a temperature between 1300° C. and 1600° C. Complete sintering can also be carried out at a somewhat higher temperature. If sintering is carried out at a temperature which is, for example, 100° C. above the temperature specified by the manufacturer of the starting material, then this is referred to as over-sintering, wherein the sintering time is the same as that for complete sintering.

In particular, complete sintering is carried out in the range between 1350° C. and 1550° C., with attainable densities between 6.03 and 6.1 g/cm', in particular between 6.04 and 6.09/cm$^3$.

The penetration of the layers results in the advantage that different physical and optical properties can be achieved across the height of the blank. Thus, once the first layer is colored to the required extent, a tooth-colored edge region can be obtained after complete sintering, in which the intensity of the tooth color decreases continuously and at the same time the translucency increases in the desired manner across the transition region formed by the penetrating first and second layer materials. The dental restoration is then produced from the blank, in particular by milling, taking into account the profile of the layer, wherein the dental restoration is "laid" in the blank such that the tooth incisor material extends in the region of the second layer.

Independently thereof, a continuous transition between the layers is provided on the basis of the teaching of the invention, i.e., the color decreases or increases continuously and/or the translucency decreases or increases continuously. Further, the flexural strength in such a way that the region of the dental restoration, which is subject to an intense loading, has a higher flexural strength than the regions which are not so heavily loaded. In this case there is no abrupt transition, but as mentioned a continuous, i.e. quasi-continuous, transition over the height of the dental restoration to be produced, a possibility not known from the prior art—since either layers of different compositions are arranged one above the other, so that a step-like change results, or exclusively from the outer surface there is a change in the material properties, i.e. over the entire dental restoration and not over its height.

In a preferred manner, it is suggested to mix the layer materials by rotating an element, in particular, about an axis extending along the longitudinal axis of the mold, to derive the structure, by displacing material from the surface of the first layer. There is also the possibility of forming the structure by means of a pressure element which acts on the first layer in the direction of the surface and which has, in particular, elevations extending in its surface with depressions extending between them so that the negative form of the element, is impressed into the surface of the first layer. Then, as explained above, the ceramic material of the second layer is filled and then smoothed to exclusively press the layers together and then pre-sinter the object being pressed.

The ceramic material used is in particular one which contains zirconium dioxide doped with yttrium oxide ($Y_2O_3$), calcium oxide (CaO), magnesium oxide (MgO) and/or cerium oxide ($CeO_2$), but in particular with yttrium oxide, wherein the material of the first layer differs from that of the second layer in terms of color and/or crystal form stabilized at room temperature.

Furthermore, the invention provides for the material of the first and/or second layer to be colored with at least one color-imparting oxide from elements of the group Pr, Er, Fe, Co, Ni, Ti, V, Cr, Cu, Mn, Tb, preferably $Fe_2O_3$, $Er_2O_3$ or $Co_3O_4$.

The invention is also characterized in that the first and the second layer are interpenetrated in their superposed regions across a height H which is a 1/15 to a quarter, in particular 1/10 to 1/5, of the total height of the first and second layers.

The first layer should have a height in an unstructured state which corresponds approximately to 1/2 to 2/3 of the sum of the first and second layers.

In order that the first layer is characterized by a high strength and the second layer is translucent to the desired extent, the invention in a further development provides for the percentage of yttrium oxide in the first layer to be 4.5 wt % to 7.0 wt %, and/or for the percentage in the second layer to be between 7.0 wt % and 9.5 wt %, wherein the percentage of yttrium oxide in the first layer is less than that in the second layer.

Furthermore, the ratio of the tetragonal phase to the cubic phase of the zirconium dioxide should be ≥1 in the first layer as well as in the second layer after pre-sintering.

In particular, the zirconium dioxide has at least a 95% tetragonal crystal form in the first layer. In the second layer, the tetragonal crystal phase should be between 51% and 80%. The remainder should be formed, in particular, by the cubic crystal phase.

The base material for the first and second layers preferably has the following composition in percentage by weight:

| | |
|---|---|
| $HfO_2$ | <3.0 |
| $Al_2O_3$ | <0.3 |
| Technically caused unavoidable components | ≤0.2 (such as $SiO_2$, $F_2O_3$, $Na_2O$) |
| For the first layer: $Y_2O_3$ | 4.5 to 7.0 |
| For the second layer: $Y_2O_3$ | 7.0 to 9.5 |
| Color-imparting oxides: | 0-1.5 |
| $ZrO_2 = 100 - (Y_2O_3 + Al_2O_3 + HfO_2$ + unavoidable components + color-imparting oxides) | |

The invention is characterized, inter alia, by the following measures. First, a first tooth-colored, ceramic material, which consists predominantly of zirconium dioxide, is filled into a mold. The filling height corresponds approximately to 1/2 to 2/3 blank height before pressing.

The surface is then structured through a specially structured element or a stamp, wherein the structure can be designed to have a continuous transition of properties from the first material to the second material. Also, the surface geometry of the first layer can be aligned with the diffusion coefficients of the layer materials.

Preferably, a rotating element is used which is lowered into the mold—in which the first layer is located—and then is immersed into the first layer to the extent required. The surface is selectively structured by rotating the element, which is structured on the layer side like a wave-like or comb-like element. Alternatively, the surface may be structured by a press plunger with a suitable geometry.

Subsequently, the mold is filled with the second, in particular, less-colored ceramic material, which should have a higher translucency and also a higher $Y_2O_3$ content. The usual pressing of the ceramic materials and pre-sintering then takes place.

There is also no departure from the invention if a material for forming an intermediate layer is then filled into the mold after the introduction of the first layer, which is preferably colored to yield the color of a tooth and is predominantly zirconium dioxide. This material should be less colored than the first material and also essentially consist of zirconium dioxide, with a yttrium oxide content higher than that of the first layer. The intermediate layer may, for example, have a height of 1/10 to 1/5 of the total height of the layers to be filled into the mold. The intermediate layer material is then mixed with the first layer. In this case, mixing takes place with an element which at least penetrates into the first layer to a depth which corresponds to the height of the intermediate layer. Then, a layer corresponding to the previously described second layer is filled into the mold, which leads to a higher translucency and should have a higher yttrium oxide content than the first layer. As explained above, the ceramic materials are then pressed to yield a blank which is pre-sintered to derive, in particular, a dental restoration by milling. A further processing step is complete sintering. The material of the intermediate layer should be that of the second layer.

Alternatively, there is the possibility that a layer of a first ceramic material is filled into the mold, a first open cavity is formed in the layer, a second ceramic material is filled into the first open cavity, and the materials are pressed together and then heat treated.

In accordance with the invention a layer of pourable material is first filled into a mold. This material may, for example, be an uncolored zirconium dioxide granular material that has a bulk density between 1 $g/cm^3$ and 1.4 $g/cm^3$, in particular between 1.15 $g/cm^3$ and 1.35 $g/cm^3$. After filling of the granular material, which can have a grain size D50 between 40 μm and 70 μm, an open hollow space is formed, for example using a press plunger. This is carried out, for example, by displacing parts of the first ceramic material, or through a slight compacting of them. The second ceramic material is then filled into the recess or cavity so formed, which in particular has a substantially conical geometry, if a crown or partial crown is to be produced from the blank, which should be geometrically aligned with the shape of a tooth stump or an abutment, and the materials pressed together.

It is also possible to form a second open cavity in the second ceramic material, which fills the first open cavity. This step can be accompanied by the simultaneous pressing of all materials.

Compacting of the materials should be carried out independently thereof.

The compression is preferably carried out at a pressure that is preferably between 1000 bar and 2000 bar. A density in the range of approximately 3 $g/cm^3$ is thereby achieved. The debinding and pre-sintering is then carried out at a temperature of between 700° C. and 1100° C., in particular in a range between 800° C. and 1000° C., for a period of between 100 minutes and 150 minutes.

The debinding and pre-sintering should be carried out in such a way to yield a tensile strength between 10 MPa and 60 MPa, in particular between 10 MPa and 40 MPa, measured according to DIN ISO 6872.

If a second open cavity is formed in the second ceramic material and a third ceramic material is filled into the latter, then its composition should differ from that of the second ceramic material, in particular it should have a lower translucency and/or higher flexural strength than the second or first material.

The invention in particular provides for several first open cavities to be formed in the layer of the first ceramic material and for the second ceramic material to be filled into them. This results in a plurality of discrete blank sections, so-called nests, so that several dental restorations can be machined out of the sections of a corresponding blank by milling and/or grinding after pre-sintering. It is thereby possible for the dimensions of the blank sections to differ from one another to enable production of restorations of different geometries, which can also differ in the geometric arrangement of the respective material regions on the root side and/or the dentin side. There is thus the possibility of deriving teeth of different shapes from one blank according to the number of nests/blank sections and their geometries. As already explained, the dentin cores are formed from the second regions and the incisal edges are formed from the first region.

In particular, the invention provides for the thermal expansion coefficient of the second ceramic material to be 0.2 μm/m*K to 0.8 μm/m*K higher than the thermal expansion coefficient of the first ceramic material. As a result of the different thermal expansion coefficients of the materials, a compressive stress is produced in the first ceramic material, i.e. in the incisor material, in a restoration made from the blank, such as a tooth, which leads to an increase in strength.

Furthermore, it is possible to color the ceramic materials to the desired extent, in particular such that a incisor material is used for the first region which is more translucent and less colored compared to the second ceramic material.

If the dental restoration or another mold body is preferably derived from the pre-sintered blank by machining, then it is naturally also possible for the blank to be initially fully sintered, to then derive the mold body, in particular by milling or grinding.

Irrespective of when the blank is fully sintered, the invention in particular provides for the sintering to be performed over a period of between 10 minutes and 250 minutes in a temperature range between 1300° C. and 1600° C. Sintering may also be carried out at a somewhat higher temperature.

If full sintering is carried out at a higher temperature that is, for example, 100° C. higher than the temperature given by the manufacturer of the starting material, for a period of time as recommended by the manufacturer, then this is referred to as over-sintering.

The present values apply in particular if the starting material substantially contains zirconium dioxide, in particular at more than 80 wt %.

The zirconium dioxide is in particular doped with yttrium oxide, but may also be doped with calcium oxide, magnesium oxide and/or cerium oxide.

If the ceramic material is colored then at least one color-imparting oxide is used from the group Pr, Er, Fe, Co, Ni, Ti, V Cr, Cu, Mn, Tb, preferably $Fe_2O_3$, $Er_2O_3$ or $Co_3O_4$.

The invention is therefore characterized in that the ceramic materials used are those which contain zirconium dioxide doped with yttrium oxide ($Y_2O_3$), calcium oxide (CaO), magnesium oxide (MgO) and/or cerium oxide ($CeO_2$), but in particular with yttrium oxide, wherein the first ceramic material differs from the material of the second ceramic material in terms of color and/or crystal forms stabilized at room temperature.

Furthermore, the invention provides for the first and/or second ceramic material used to be one such that the percentage of yttrium oxide in the second material is from 4.5 wt % to 7.0 w % and/or the percentage in the first material is 7.0 wt % to 9.5 wt %, wherein the percentage of yttrium oxide in the first ceramic material is higher than that in the second material.

The materials of the first and also the second region should be selected such that the ratio of the tetragonal crystal phase to the cubic crystal phase of the zirconium dioxide of both regions after pre-sintering should be ≥1.

The starting material for the first and second ceramic materials preferably has the following composition in percentage by weight:

| | |
|---|---|
| $HfO_2$ | <3.0 |
| $Al_2O_3$ | <0.3 |
| Technically caused unavoidable components | ≤0.2 (such as $SiO_2$, $F_2O_3$, $Na_2O$) |
| For the first layer: $Y_2O_3$ | 7.0 to 9.5 |
| For the second layer: $Y_2O_3$ | 4.5 to 7.0 |
| Color-imparting oxides: | 0-1.5 |
| $ZrO_2 = 100 - (Y_2O_3 + Al_2O_3 + HfO_2$ + unavoidable components + color-imparting oxides) | |

There is the possibility of additionally adding binding agents. This is not taken into account in the above statement of percentage by weight.

The teaching according to the invention yields after complete sintering a monolithic dental restoration, which does not have to be veneered, but if so this is not a departure from the invention.

Further details, advantages and characteristics of the invention result not only from the claims and their features, both by themselves and/or in combination, but also from the following description of the preferred example embodiments shown in the drawings.

BRIEF DESCRIPTION OF THE DRAWINGS FIGURES

Figure 1B:
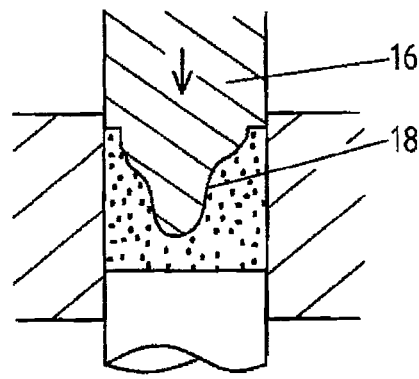
Figure 1C:
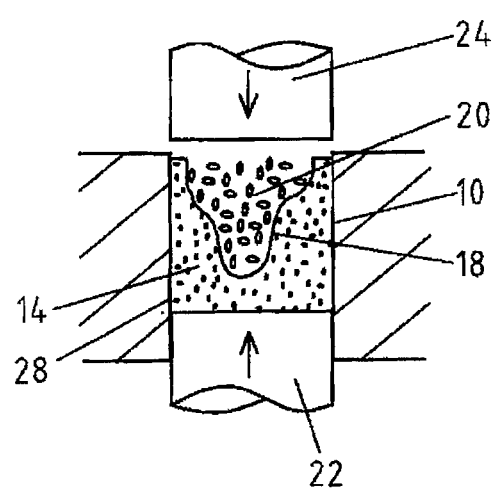
Figure 2:
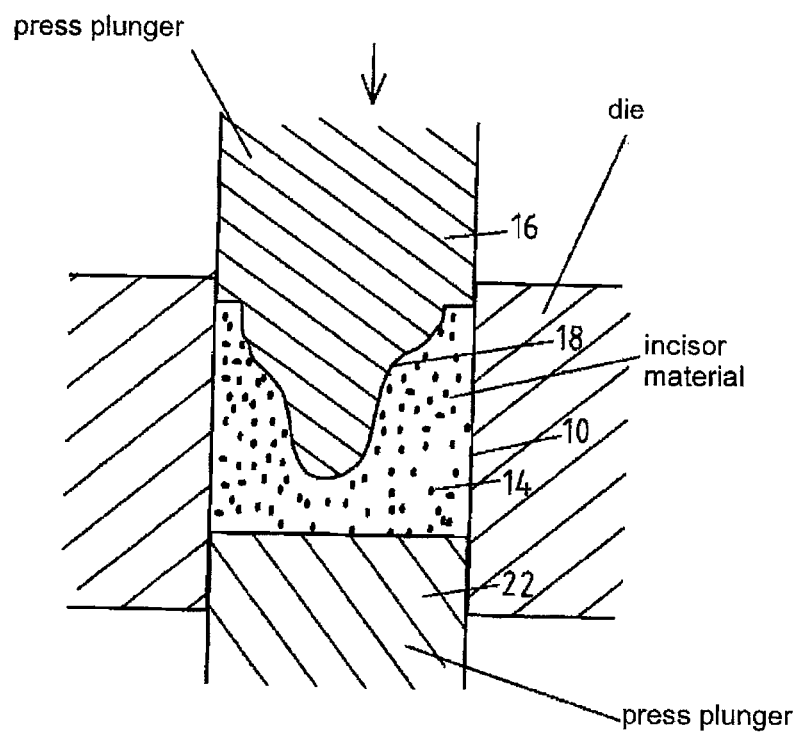
Figure 3:
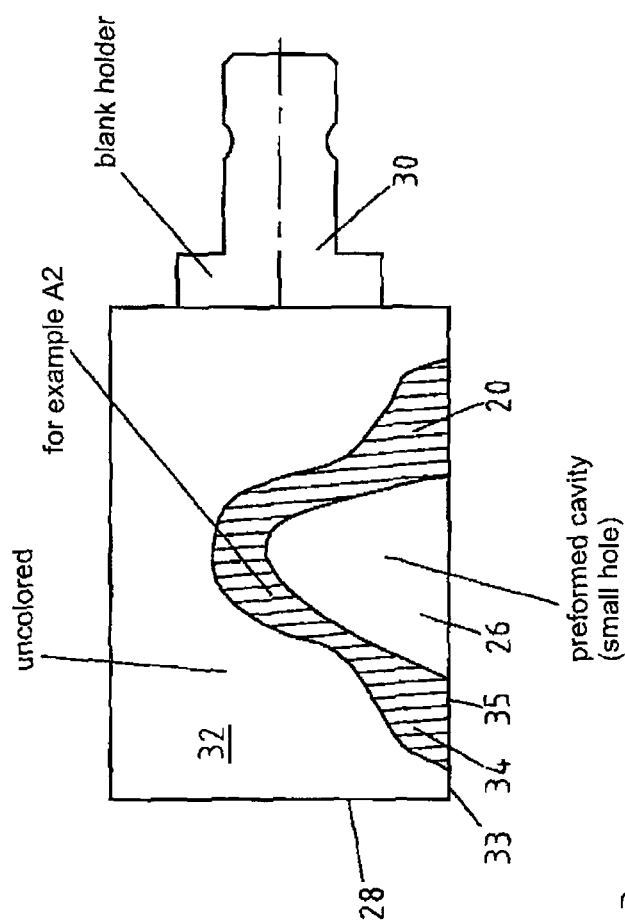
Figure 4:
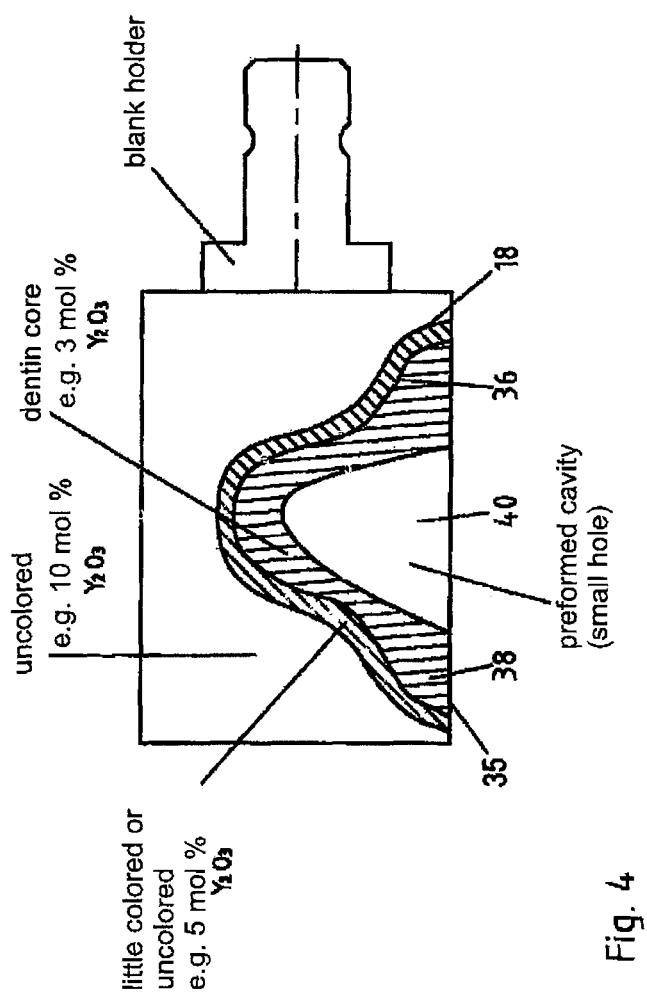
Figure 5:
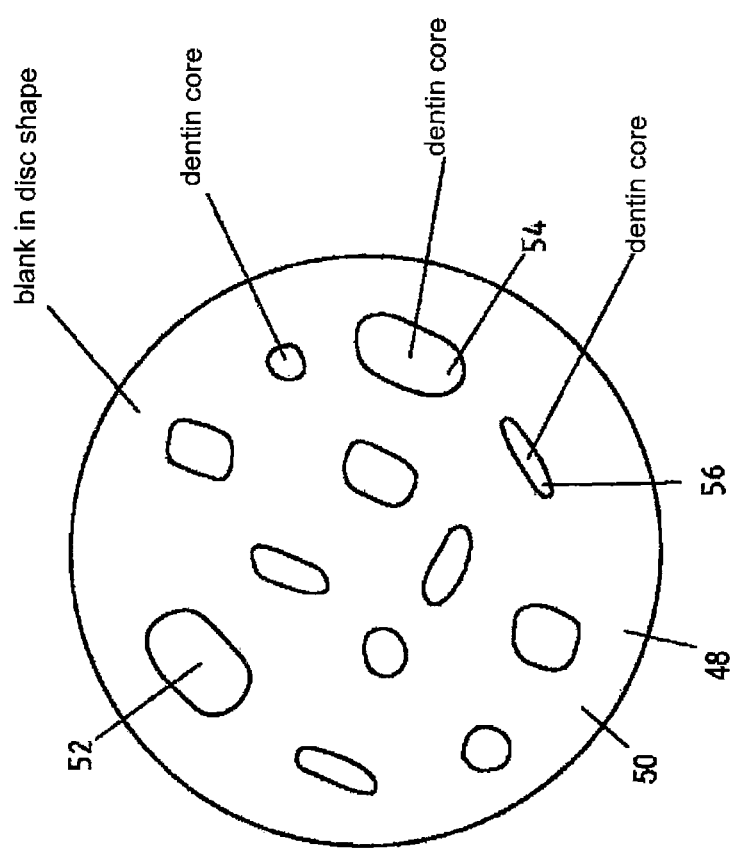
Figure 6:
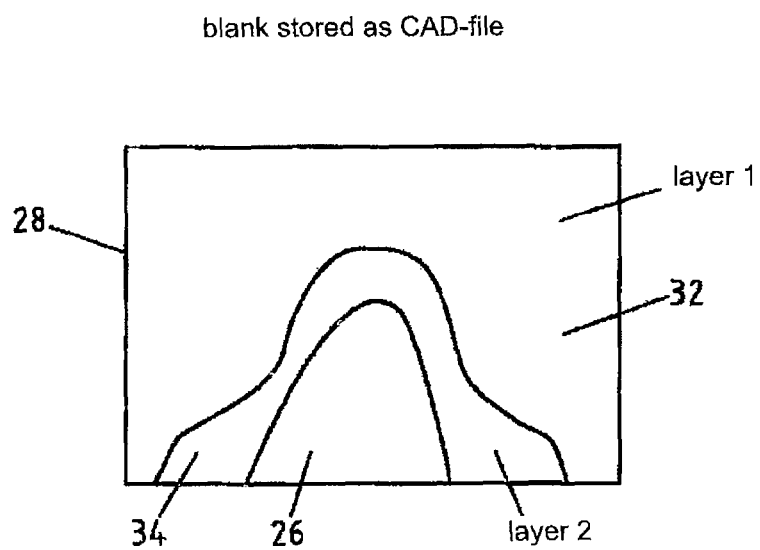
Figure 7:
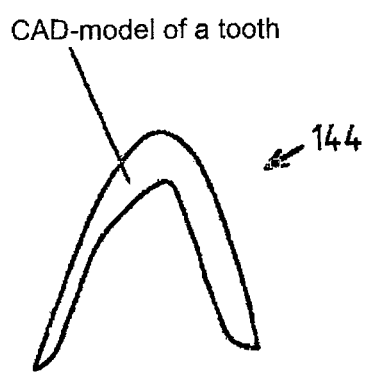
Figure 8:
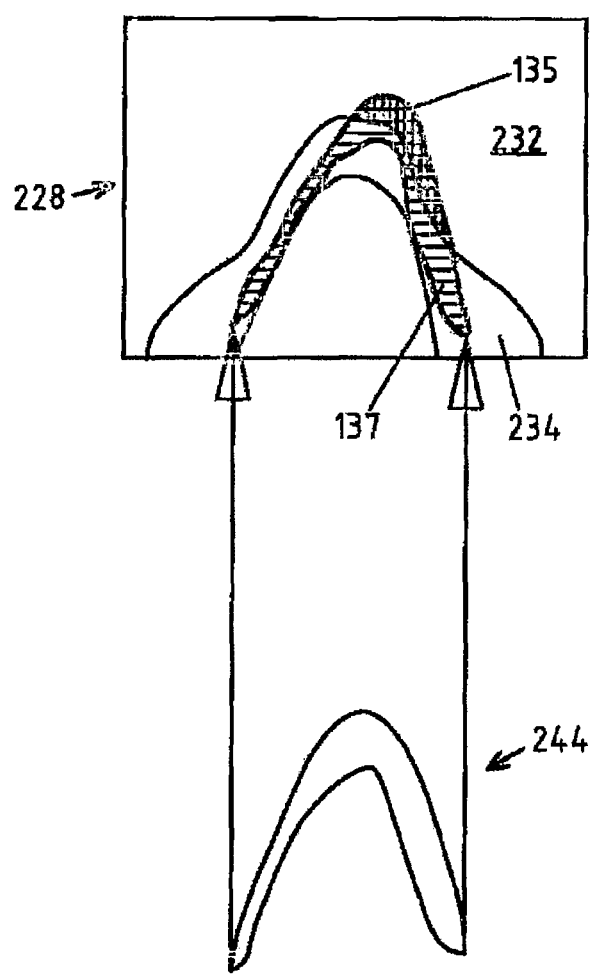
Figure 9:
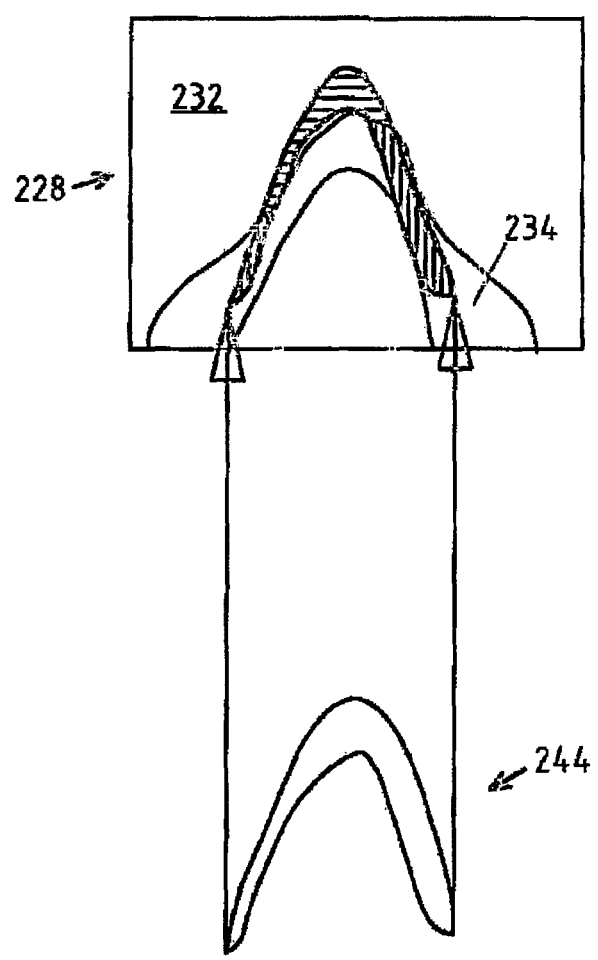
Figure 10A:
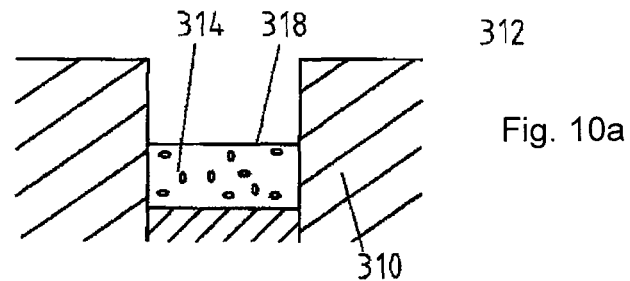
Figure 10B:
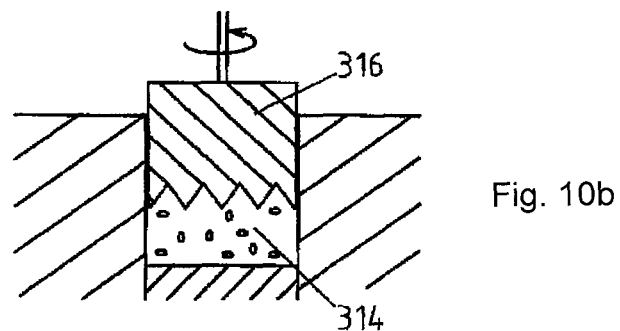
Figure 10C:
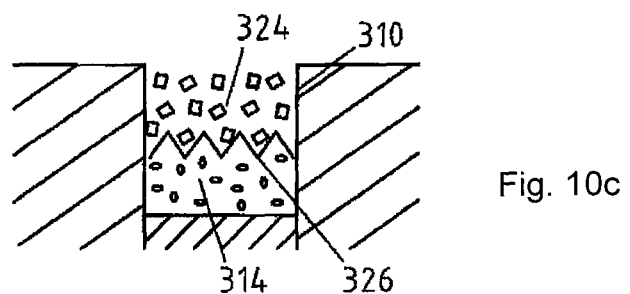
Figure 10D:
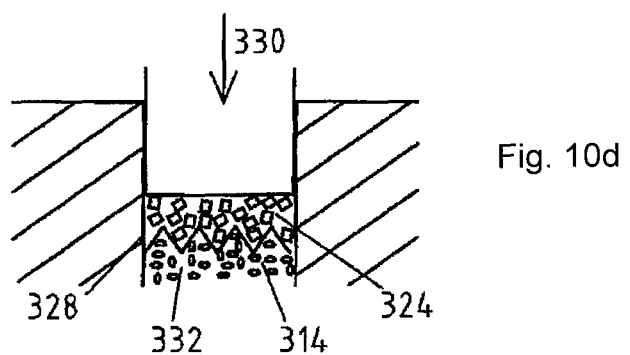
Figure 11:
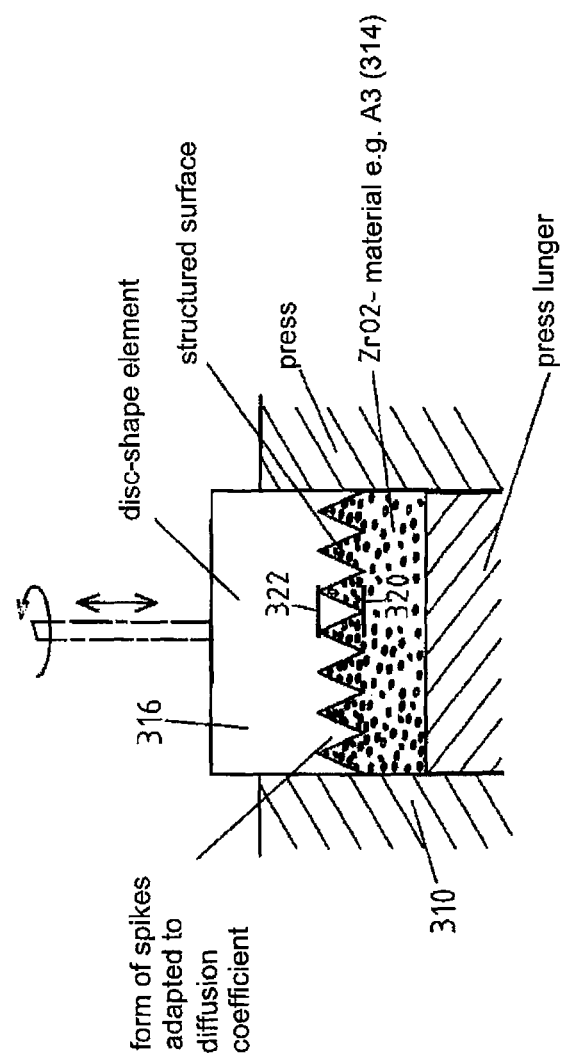
Figure 14A:
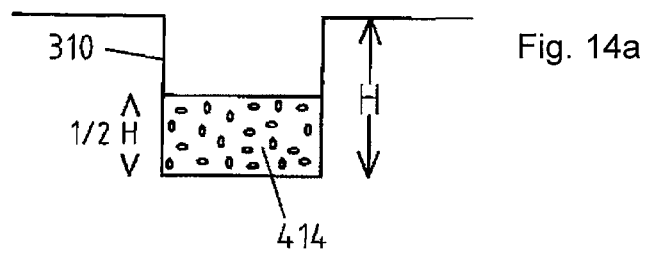
Figure 14B:
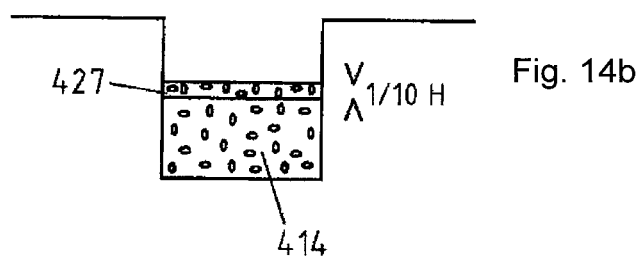
Figure 14C:
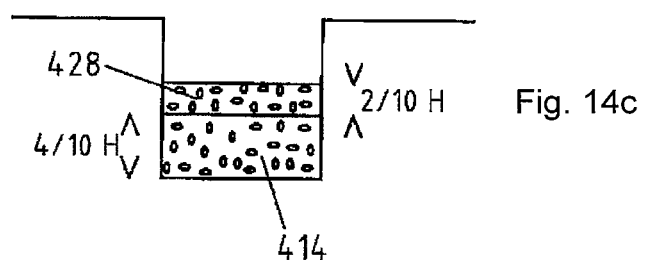
Figure 14D:
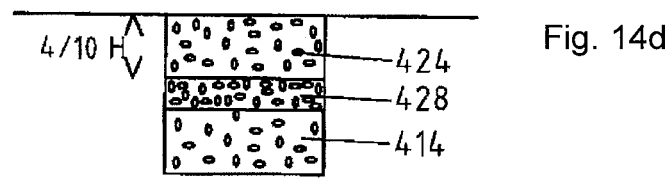

FIG. 1a shows a schematic view of an assembly to perform a step of the method of the present invention, FIG. 1b shows a schematic view of the assembly shown in FIG. 1a to perform another step of the method of the present invention, FIG. 1c shows a schematic view of an assembly shown in FIG. 1b to perform another step of the method of the present invention, FIG. 2 shows FIG. 1b in greater detail, FIG. 3 shows a blank with regions of different material properties, FIG. 4 shows another blank with regions of different material properties, FIG. 5 shows a top view of a blank with a number of regions of different material properties, FIG. 6 shows a blank corresponding to FIG. 4, FIG. 7 shows a tooth replacement derived from the blank in accordance with FIG. 6, FIG. 8 shows a virtual model of the blank in accordance with FIG. 6, together with a virtual model that corresponds to the tooth replacement according to FIG. 7, FIG. 9 shows an alternative representation to that of FIG. 8, FIG. 10a shows a schematic of an assembly and a method step of the present invention that can be carried out with it, FIG. 10b shows a schematic of the assembly shown in FIG. 10a and another method step of the present invention that can be carried out with it, FIG. 10c shows a schematic of the assembly shown in FIG. 10b and another method step of the present invention that can be carried out with it, FIG. 10d shows a schematic of the assembly shown in FIG. 10c. and another method step of the present invention that can be carried out with it, FIG. 11 shows FIG. 10b in greater detail, FIG. 12a show a schematic of the properties of a blank formed by the method steps of the present invention, FIG. 12b shows another schematic of the properties of a blank formed by the method steps of the present invention, FIG. 12c shows another schematic of the properties of a blank formed by the method steps of the present invention, FIG. 12d shows another schematic of the properties of a blank formed by the method steps of the present invention, FIG. 13 shows a schematic of a bridge to be produced from a blank in accordance with FIG. 12a FIG. 12d, FIG. 14a shows a schematic of an alternative method of the present invention, FIG. 14b shows another schematic of an alternative method of the present invention, FIG. 14c shows another schematic of an alternative method of the present invention, and FIG. 14d shows another schematic of an alternative method of the present invention.

DETAILED DESCRIPTION OF THE INVENTION

The teaching according to the invention is described by reference to the Figures, in which the same elements are essentially provided with the same reference symbols. On the basis of this teaching, in particular, dental restorations are produced from a ceramic material which has a monolithic structure such that an immediately usable, monolithic tooth replacement is available.

For this purpose, the invention provides for a blank to be produced which has regions of ceramic materials with differing compositions and thus properties, through which, in particular optical and mechanical properties, as required for the restoration, can be obtained. Thus, offering the possibility of using the monolithically produced dental tooth replacement immediately after complete sintering, without the need, for example, to apply an incisal edge by hand and firing.

It is also possible to achieve desired strength values in the regions in which high loads occur. Desired optical properties are achievable, as well.

The production of a blank from which a dental restoration can be produced, in the example embodiment, a tooth is described with reference to FIGS. 1 to 3.

Thus, a pourable granular material in the form of a first ceramic material 14, which is, in particular, an yttrium oxide-stabilized zirconium dioxide, which may have the following composition in percentage by weight, is initially filled into a mold 10 of a pressing tool 12:

| | |
|---|---|
| $HfO_2$ | <3.0 |
| $Al_2O_3$ | <0.3 |
| $Y_2O_3$ | 7.0 to 9.5 |
| Color-imparting oxides: | 0-1.5 |
| Technically caused unavoidable components | ≤0.2 (such as $SiO_2$, $F_2O_3$, $Na_2O$) |
| $ZrO_2$ | 100 − ($Y_2O_3$ + $Al_2O_3$ + $HfO_2$ + color-imparting oxides + technically caused unavoidable components) |

A binding agent may also be added and is not taken into consideration in the above percentage by weight values.

In particular, however, it is provided that the composition does not contain color-imparting oxides or contains them only in small quantities, e.g. s 0.5% by weight, since the first ceramic material 14 is used as the incisor material so that a high translucency is desired. The relatively high percentage of yttrium oxide ensures that the tetragonal crystal phase fraction is only 50 to 60% in the prepared mold part, i.e. the dental restoration, and the remainder is the cubic and monoclinic crystal phase.

Then an open cavity 18 is formed by means of a press plunger 16 in a material 14 or the layer formed by it. By means of the press plunger, the material 14 is displaced or slightly compressed. After the cavity 18 is formed (FIG. 1b), the press plunger 16 is removed and a second ceramic material 20, which can have one of the following compositions in percentage by weight, is filled into the cavity 18:

| | |
|---|---|
| $HfO_2$ | <3.0 |
| $Al_2O_3$ | <0.3 |
| $Y_2O_3$ | 4.5 to 7.0 |
| Color-imparting oxides: | 0-1.5 |
| Technically caused unavoidable components | ≤0.2 (such as $SiO_2$, $F_2O_3$, $Na_2O$) |
| $ZrO_2$ | 100 − ($Y_2O_3$ + $Al_2O_3$ + $HfO_2$ + color-imparting oxides + technically caused unavoidable components) |

A coloring oxide or oxides fraction should be present to a degree that a desired tooth color results, since the dentin of the tooth to be produced is formed from the second ceramic material 20. The relatively low content of $Y_2O_3$ also ensures that the fully sintered tooth replacement has a high tetragonal phase content of at least 85%, preferably of at least 90%, so that a high strength results.

After filling the second ceramic material 20 into the cavity 18 (FIG. 1c), the materials 14, 20, or the layers or regions formed therefrom, are then pressed in the mold 10 by means of a lower or upper press plunger 22, through which compression is achieved. After pressing, the blank 28 has a density of approximately 3 g/cm³. The pressing is preferably carried out at a pressure between 1000 bar and 2000 bar.

With regard to the materials 14, 20, these should have a bulk density between 1 g/cm³ and 1.4 g/cm³. After pressing the density is approximately 3 g/cm³.

The representation of FIG. 1b) is shown in more in detail in FIG. 2. It can be seen that the cavity 18 is formed by the press plunger 16 in the first ceramic material 14 or in the layer consisting of the material. On the bottom side, the mold 10 is delimited by the press plunger 22.

As can be seen from FIG. 3, a second cavity 26 can be formed in the second material 20 after its compression by means of the press plungers 22, 24 or, if appropriate, after the pre-sintering, for example through milling.

In the cavity 18, which is open on the bottom side, and filled completely with the material 20 it is however, according to FIG. 1c), also possible to form a second cavity 26 by means of a press plunger (not shown).

Irrespective of whether the second cavity 26 is present or not, following pressing a pre-sintering of the blank 28 is carried out at a temperature, in particular in the range between 800° C. and 1000° C., for a period of time between 100 minutes and 150 minutes. In the process, debinding takes place first, followed by pre-sintering. The density of the blank 28 after pre-sintering is about 3 g/cm³. The fracture strength of the pre-sintered blank 28 should be between 10 MPa and 60 MPa.

The blank 28 is provided with a holder 30 to fix the blank 28 to, for example, a milling or grinding machine to obtain derive a dental restoration, such as a tooth, from the blank 28, as described with reference to FIGS. 6 to 9. The tooth to be produced is at least virtually placed in the blank 28 in such a way that the incisal region extends in the region 32 formed by the first ceramic material 14, and the dentin region extends in the second region 34 formed by the second ceramic material 20. Working of the blank 28 is then carried out taking into account these data.

FIG. 4 shows that, after filling the first cavity 18 in the first ceramic material 14 and filling the second ceramic material 20 into the cavity 18, a second cavity 36 is formed, if appropriate, in accordance with the method according to FIG. 1b), and a third ceramic material 38 is filled into the cavity 36 so formed, said ceramic material 38 differing from the second ceramic material in its composition in such a way that, in particular, a higher strength can be achieved. A cavity 40 can also be formed in the third ceramic material 38, as described with reference to FIG. 3.

On the basis of the teaching according to the invention, it is possible to form a blank 48 with a plurality of regions 52, 54, 56 (FIG. 5), which consist of the second ceramic material and possibly the third ceramic material and can have different geometries to derive corresponding teeth of different geometries. The so-called second regions 52, 54, 56 formed from the second ceramic material 20 are embedded in the first ceramic material 50, i.e. they are surrounded by the first ceramic material 14, as can also be seen in particular from the figures. The second regions 52, 54, 56 are uncovered on the base side.

As can be seen in particular from FIGS. 2-4, the second regions have outer geometries which taper starting from the bottom region, i.e. from a base region 35. A conical geometry is obtained, the outer contour being a free-form surface.

The base region 35, or the base surface delimiting it on the bottom side, merges flush with the underside or bottom surface 33 of the first region 32.

To produce the blank sections 52, 54, 56, also referred to as nests, corresponding open cavities are required in the layer produced from the first material 14 and designated as the first region 50, with the filling of the pourable second ceramic material 20 into the cavities in the manner previously described, followed by pressing of the materials 14, 20 together, i.e. compacting them.

With regard to the physical properties of the materials 14, 20, in addition to a different translucency and strength, they should also have thermal expansion coefficients which differ from one another. In particular, the invention provides that after complete sintering, the first ceramic material 14 has a coefficient of thermal expansion which is 0.2 μm/m*K to 0.8 μm/m*K lower than the second region 38, 52, 54, 56 formed from the second ceramic material 20. As a result, a compressive stress is produced in the first region 50, i.e. in the incisor material, which leads to an increase in the strength.

The blanks 28, 48, can have a cuboid shape, for example with the dimensions 18×15×25 mm, or a disk shape, for example with a diameter of 100 mm, without thereby limiting the teaching according to the invention. Thereby, as described with reference to FIG. 5, the advantage is that, for example, a plurality of second regions 52, 54, 56—so-called dentin cores—can be formed in, for example, a disc-shaped blank to produce restorations of different geometries, but with a favorable layer profile in terms of translucency and strength.

The position of one or more second regions 52, 54, 56, i.e. the nests, which may have different geometries, are known and can be stored as a data set. Then, the restorations to be produced, which are present as CAD data sets, are positioned relative to and in the blank sections so that the tooth replacement can be derived from the blank by milling and/or grinding.

The following method is provided according to the teaching of the invention, explained in more detail with reference to FIGS. 6 to 9, starting from a blank having layers or regions of different compositions, as explained above, in particular by means of milling and/or grinding.

A blank is shown in FIG. 6 which in principle corresponds to that of FIG. 3. This means that the blank 28 consists of a first region 32 and a second region 34, in which a cavity 26 extends. The region 32 has a higher translucency than the region 34, wherein the strength in the region 34 is higher than in the region 32. Thus, the region 32 is for a incisal region of a tooth 144 according to FIG. 7, which is to be machined from the blank 28 by a CAM method. The region 34, in turn, is suitable for the dentin region.

The profile of the regions or layers 32, 34 and the cavity 26 in the blank 28 is known on the basis of the method steps carried out and previously defined so that the profile and the position of the layers 32, 34 is stored in a data set on the basis of which the blank 28 can be displayed virtually.

The data of the tooth 144, which has been designed three-dimensionally by using a suitable software, a so-called CAD program, are also known. To produce the tooth 144 from the blank 28, the virtual model 244 of the tooth 144 is positioned in the virtual model 228 of the blank 28, as shown in FIG. 8. The model 244 of the tooth is thereby placed in the virtual model 228 of the blank, if necessary through the individual action of an operator, such that the incisal section extends in the virtual layer 232 corresponding to the layer 32 and the dentin portion in the virtual layer 234 corresponding to the layer 34, as shown in principle in FIG. 8. The incisal region 135 is indicated by cross-hatching and the dentin region 137 by simple hatching. The data of the blank 228 corresponding to the placement of the tooth 244, that is, the intersecting region between the virtual blank 228 and the virtual tooth 244, are then determined to pass the data to a numerically controlled processing machine, which then produces the tooth 144 from the real blank 28, in particular through milling or grinding. Production is according to the CAM method.

FIG. 9 shows a representation corresponding to FIG. 8, with the limitation that the virtual tooth 244 is placed, in contrast to FIG. 8, in another region of the virtual blank 228, wherein a region of the incisor material extends in the region 232 and a region of the dentin extends in the region of the layer 234. The placing of the virtual tooth 244 in the virtual blank 228 is performed according to the requirements to be placed on the tooth or the restoration to be produced.

In other words, from the knowledge of the profile of the real regions 32, 34 in the blank 28, the virtual model 228 is generated in which the virtually generated tooth 244 is placed such that in the example embodiment the incisal and dentin regions extend in the regions or layers of the virtual blank and thus real blank in the production of the tooth 144, so that the incisal and dentin regions of the tooth 144 produced meet requirements, for example in terms of translucency and strength to the degree required.

A monolithic restoration is made available on the basis of the teaching according to the invention which in principle does not require post-processing, in particular not the veneers required in the incisal region according to the prior art.

Corresponding to the teaching according to the invention, restorations can also be produced from a blank which, as shown in FIG. 5, has nests which consist of materials which differ from that of the basic body of the blank 48.

However, it is also possible, by way of departure from the method described above, to produce blanks which have layers or regions that have differing compositions to achieve desired properties such as translucency or strength. Thus, it is possible to fill a first layer into a mold, which surface is then structured before a second layer is filled which has a composition different to that of the first layer. The materials themselves are, in particular, those which have been described with respect to FIGS. 1 to 5. A corresponding blank has an intermediate layer in which the material of the first layer decreases continuously or substantially continuously, whereas that of the second layer increases.

An alternative possibility is that, after the first layer has been filled, a further layer of a ceramic material is filled into the mold which differs from the ceramic material of the first layer. The material of the first layer is then mixed with that of the further layer to form an intermediate layer.

Subsequently, a layer which similarly differs in composition from that of the first layer and preferably corresponds to the material used for the further layer is then laid onto the intermediate layer thus formed.

With regard to the materials, reference is also made to previous descriptions.

The production of corresponding blanks is now explained in more detail with reference to FIGS. 10 to 14.

According to FIG. 10 a), a first material 314, which is, in particular, zirconium dioxide stabilized with yttrium oxide, which can have the following composition in percentage by weight, is first filled into a mold 310 of a press 312:

| | |
|---|---|
| $HfO_2$ | <3.0 |
| $Al_2O_3$ | <0.3 |
| Technically caused unavoidable components | ≤0.2 (such as $SiO_2$, $F_2O_3$, $Na_2O$) |
| $Y_2O_3$ | 4.5 to 7.0 |
| Color-imparting oxides: | 0-1.5 |
| $ZrO_2 = 100 - (Y_2O_3 + Al_2O_3 + HfO_2$ + unavoidable components + color-imparting oxides) | |

Subsequently, a second layer 324 is filled into the mold 310 (FIG. 10 c), whereby the total height of the layers 314 and 324 is equal to 2× the height of the layer 314 in the unstructured state, without any restriction of the teaching according to the invention. The second layer may have the following composition in percentage by weight:

| | |
|---|---|
| $HfO_2$ | <3.0 |
| $Al_2O_3$ | <0.3 |
| Technically caused unavoidable components | ≤0.2 (such as $SiO_2$, $F_2O_3$, $Na_2O$) |
| $Y_2O_3$ | 7.0 to 9.5 |
| Color-imparting oxides: | 0-1.5 |
| $ZrO_2 = 100\% - (Y_2O_3 + Al_2O_3 + HfO_2$ + unavoidable components + color-imparting oxides) | |

The materials of the layers are naturally interchangeable, i.e. the material of the first layer described above can be that of the second and vice versa.

The color-imparting oxides are in particular those from the group Pr, Er, Fe, Co, Ni, Ti, V Cr, Cu, Mn, Tb, preferred $Fe_2O_3$, $Er_2O_3$ or $CO_3O_4$.

If the first layer 314 preferably has a height which corresponds to half the total height H of the first and second layers 314, 324, then the height of the first layer 314 can also be ½ H to ⅔ H and thus that of the second layer 324 ⅓ H to ½ H.

The smoothed surface is then structured according to step b). For this purpose, for example, a disk-shaped, plate-shaped or web-shaped element 316 is used, which in the example embodiment has a toothed geometry on the layer side, so that a corresponding negative structure is formed in the surface 318 of the layer 314 by displacing material. This structure presents as concentric-extending elevations with surrounding valleys. The distance between elevation (peak) and the valley (depression), i.e. the clear distance between the projection 320 and the valley bottom 322 according to FIG. 11, should be approximately ⅕ of the height of all layers.

In particular, it is provided that the structure is formed in such a way that the volume of the elevations is equal to, or approximately equal to, the volume of the depressions or valleys.

Since the material of the second layer 324 penetrates into the bases of the valleys 326 in the surface 318 of the layer 314, there is a continuous transition between the properties of the layer 314 and the layer 324, after the layers 324, 314 have been pressed according to FIG. 10 d). The transition or intermediate layer is denoted by the reference numeral 328 in FIG. 10 d).

The layer 324 consists of a material that is different to that of the layer 314. The difference in particular lies in the color additives and in the percentage of yttrium oxide. This is selected such that the proportion of the cubic crystal phase in the layer 324 after the pre-sintering is significantly greater than that in the layer 314. In the layer 314, the tetragonal crystal phase fraction is more than 85%, while the cubic crystal phase fraction in layer 324 is between 30% and 49%. The remainder is essentially the tetragonal crystal phase.

These different crystal phase fractions are due to the fact that the yttrium oxide percentage is between 4.5% and 7% in the layer 314 and between 7 wt % and 9.5 wt % in the layer 324, whereby the percentage in the first layer 314 is less than in the second layer 324.

The color oxide content in the layer 324 is reduced compared to the layer 314, and should be in the range between 0.0 and 0.5 wt %, preferably between 0.005 and 0.5 wt %. As a result of this measure, there is a continuous color transition between the layers 314 and 324. Due to the higher yttrium oxide content, the layer 324 has a lower flexural strength and also a higher translucency than the layer 314.

The layer 314 has the highest strength, where the heavily loaded regions of the dental replacement to be derived from the blank are located in the case of bridges in particular the connector undersides, as shown in FIG. 13.

The layers 314, 324 are pressed by means of a punch 330, wherein the pressing takes place at a pressure between 1000 bar and 2000 bar.

The pourable material, i.e. in that state in which it is filled into the mold 310, has a bulk density of between 1 g/cm³ and 1.4 g/cm³. After pressing, the density is approximately 3 g/cm³.

The structuring yields a density of up to 2 g/cm³ in the transition region between the non-mixed regions of the first and second layers 314, 324 before the layers 314 and 324 are compressed. The transition region can also be referred to as middle layer 328.

After pressing, the produced blank 333 is ejected from the mold 310 and pre-sintered in the customary manner at a temperature of between 800° C. and 1000° C. over a period between 100 minutes and 150 minutes. A corresponding blank is also shown in FIG. 13. The blank 333 has the compressed layer 314, the compressed layer 324, and the compressed middle layer 328, i.e. the transitional area.

If a tooth replacement is milled from the blank 333, in the example embodiment a bridge 334, the milling program is designed in such a way that the lower region of the bridge 334 extends, in particular, in the region of the connector bases 336 into the layer 314 with the highest flexural strength. The incisal region 340 of the bridge, on the other hand, extends in the layer 324.

In the transition region, i.e. in the middle layer 328, in which the quasi-continuous or continuous transition between the layers 314 and 324 takes place, there is the transition between dentin and incisor. The dentin extends in the region 314.

The substantial features of the teaching according to the invention are again described with reference to FIG. 12. Thus, the blank 333 is shown in FIG. 12 with the layers 314 and 324, as well as the transition region 328.

FIG. 12b is intended to illustrate that the stabilizing agent in the form of yttrium oxide is approximately 5 wt % in the first layer 314 and approximately 9 wt % in the second layer 324, and that on the basis of the formation of the intermediate layer according to the invention, the percentage of yttrium oxide increases continuously. The values 0.425H and 0.575H thereby illustrate that the element 316 shown in FIGS. 10 and 11 is immersed in the first layer 314 in such a way that valleys form which extend with respect to the total height H of the layers 314, 324 in a region of 0.075H below the surface 318 and the elevations or peaks in a region of 0.075H above the surface 318, whereby as mentioned the distance between the peaks 320 and valleys 322 of the saw-tooth-shaped structure of the element 316 is 0.15H.

Measurements of fully sintered layers 314 and 324 in accordance with DIN ISO 6872 have shown that the flexural strength GB in layer 314, in which more than 80% of the tetragonal crystal phase of zirconium dioxide is present, is approximately 1000 MPa. In contrast, the flexural strength in the layer 324, in which 30 to 49% cubic crystal phase is present, is approximately 660 MPa.

FIG. 12 d shows the change in translucency over the height of the layers 314, 324.

With reference to FIG. 14, an alternative method is described, which follows the teaching according to the invention, for the production of a blank/dental restoration which has a substantially continuous transition between a first layer and a second layer, and in the case of a restoration between the dentin region and incisal region in terms of translucency and strength.

Thus, according to FIG. 14a, a first ceramic material, which should correspond to that of the layer 314 according to FIG. 10, is first filled into a mold 310. The corresponding layer in FIG. 14 is designated by 414. The height of this layer can be half the height of the total layers filled into the matrix 310. A layer 427 with a thickness which in the example embodiment is 1/10 of the total height of the layers is then applied to the layer 414. The material of the layer 427 may correspond to that of the second layer 24 according to FIG. 10. Then, the layer 427 is mixed with a surface region of the layer 414 over a depth corresponding to the thickness of the layer 427. This forms an intermediate layer 428 having a thickness of 2/10 of the total height of the layers. A further layer 424, which corresponds to the second layer 324 according to FIG. 10, is then applied to the intermediate layer 428. The height of the layer 424 in the example embodiment is thus 4/10 of the total height H. Subsequently, the layers 424, 428, 414 are pressed as a whole according to the example embodiment of FIG. 10, so that the steps pre-sintering, working and full sintering are performed, as explained above. The working step can naturally follow after the complete sintering.

The invention claimed is:

1. A method for the production of a dental restoration from a blank, which has regions or layers of ceramic materials with differing compositions, comprising:
   a) filling of a first layer of a first ceramic material in pourable condition into a mold,
   b1) structuring the first layer in such a way that the first layer when viewed across its surface differs from region to region in its height, and then as a second layer filling into the mold a second ceramic material in pourable condition with a composition that is different from that of the first layer, or
   b2) after filling of the first layer, filling a further layer of a further ceramic material in pourable condition into the mold, which differs from the first ceramic material, mixing material of the first layer with the material of the further layer to form an intermediate layer, and then filling a second ceramic material into the mold, or
   b3) after filling the first layer forming of at least one first open cavity in the first layer and then filling a second ceramic material into the at least one first open cavity,
   wherein the ceramic materials contain zirconium dioxide doped with yttrium oxide ($Y_2O_3$), calcium oxide (CaO), magnesium oxide (MgO) and/or cerium oxide ($CeO_2$), and
   wherein the material of the first layer (14) differs from the material of the second layer (24) in terms of color and proportions of stabilized crystal forms present at room temperature,
   c) pressing of the ceramic materials to form a blank,
   d) removal of the blank from the mold,
   e) temperature treatment of the blank,
   wherein in accordance with the method steps a)+b1), or a)+b2), or a)+b3) the ceramic materials are filled into the mold and/or treated in the mold in such a way that layers and/or regions after the temperature treatment exhibit a pre-determined course that is available as a digital data set,
   f) virtual designing of the dental restoration or a form that corresponds to the dental restoration taking shrinkage into account,
   g) virtual representation of the blank, positioning of the virtually represented dental restoration or the form in the blank, taking into consideration the material properties of the layers and/or regions,
   h) determining data for the blank that corresponds to the position of the virtually arranged dental restoration or the form in the blank,
   i) transferring data to a machine to derive the dental restoration or the form from the blank.

2. The method according to claim 1, wherein several first open cavities are formed in the layer of the first ceramic material, and the second ceramic material is filled into said cavities.

3. The method according to claim 1, wherein at least some of the plurality of the first open cavities have differing internal geometries.

4. The method according to claim 1, wherein at least the second ceramic material is colored with at least one coloring oxide of elements from the group Pr, Er, Tb, Fe, Co, Ni, Ti, V, Cr, Cu, Mn, preferably $Fe_2O_3$, $Er_2O_3$ or $Co_3O_4$.

5. The method according to claim 1, wherein the material used for the first and/or second ceramic material is one in which the percentage of yttrium oxide in the first material is 7.0 wt % to 9.5 wt % and/or the percentage of yttrium oxide in the second and/or further ceramic material is 4.5 wt % to 7.0 wt %, wherein the percentage of yttrium oxide in the first ceramic material is higher than that in the second or further ceramic material.

\* \* \* \* \*